(12) United States Patent
Tanigawa et al.

(10) Patent No.: US 8,955,787 B2
(45) Date of Patent: Feb. 17, 2015

(54) FILAMENT WINDING APPARATUS (75) Inventors: Motohiro Tanigawa, Kyoto (JP);
Tadashi Uozumi, Kyoto (JP); Daigoro Nakamura, Kyoto (JP); Ken Hatta, Toyota (JP)

(73) Assignees: Murata Machinery, Ltd., Kyoto (JP); Toyota Jidosha Kabushiki Kaisha, Aichi (JP)

( * ) Notice: Subject to any disclaimer, the term of this patent is extended or adjusted under 35 U.S.C. 154(b) by 124 days.

(21) Appl. No.: 13/885,379

(22) PCT Filed: Sep. 22, 2011

(86) PCT No.: PCT/JP2011/071625
§ 371 (c)(1),
(2), (4) Date: Jun. 5, 2013

(87) PCT Pub. No.: WO2012/066851
PCT Pub. Date: May 24, 2012

(65) Prior Publication Data
US 2013/0256447 A1    Oct. 3, 2013

(30) Foreign Application Priority Data

Nov. 16, 2010 (JP) .................................. 2010-256184

(51) Int. Cl.
*B65H 54/64* (2006.01)
*B65H 59/38* (2006.01)
*B29C 53/60* (2006.01)
*B29C 53/80* (2006.01)

(52) U.S. Cl.
CPC ............ *B65H 59/387* (2013.01); *B29C 53/602* (2013.01); *B29C 53/8016* (2013.01); *B29C 2053/8025* (2013.01)

USPC .................... 242/438.1; 242/437; 242/439.6; 242/441.4

(58) Field of Classification Search
USPC .............. 242/437, 438.1, 439.6, 441.1, 441.4
See application file for complete search history.

(56) References Cited

U.S. PATENT DOCUMENTS

| 3,128,216 | A | * | 4/1964 | Reed .............................. 156/190 |
| 3,304,705 | A | * | 2/1967 | Rathje et al. ...................... 57/18 |
| 3,666,190 | A | * | 5/1972 | Dykmans ................... 242/438.1 |
| 4,020,996 | A | * | 5/1977 | Deeg ............................. 242/440 |
| 4,323,200 | A | * | 4/1982 | Denoor et al. ............. 242/438.1 |
| 4,470,552 | A | * | 9/1984 | Parham et al. ............. 242/437.2 |

(Continued)

FOREIGN PATENT DOCUMENTS

| JP | 2005255359 A | 9/2005 |
| JP | 2010036461 A | 2/2010 |

*Primary Examiner* — Emmanuel M Marcelo
(74) *Attorney, Agent, or Firm* — DLA Piper LLP (US)

(57) ABSTRACT

A filament winding apparatus that prevents excessive unraveling of a fiber bundle due to variations in the speed at which the fiber bundle is wound includes a hoop winding device having a wrapping table, a bobbin support unit, a braking unit, a slack removal unit, a detector, and a controller. The slack removal unit absorbs slack caused by the difference between winding and unraveling speeds of the fiber bundle. The detector detects whether the amount of slack absorbed is equal to or greater than or is less than, a predetermined amount. When the amount of slack is equal to or greater than the predetermined amount, the controller increases the braking force of the braking unit for braking rotation of a bobbin. When the amount of slack is less than the predetermined amount, the controller reduces the braking force of the braking unit for braking rotation of the bobbin.

3 Claims, 7 Drawing Sheets

(56) References Cited

U.S. PATENT DOCUMENTS

| | | | |
|---|---|---|---|
| 7,878,447 B2* | 2/2011 | Hartzheim | 242/615.2 |
| 7,997,521 B1* | 8/2011 | Henson | 242/438.1 |
| 2007/0152093 A1* | 7/2007 | Hartzheim | 242/419.1 |
| 2008/0035780 A1* | 2/2008 | Kanoh et al. | 242/437.2 |
| 2009/0065622 A1 | 3/2009 | Uozumi et al. | |
| 2010/0032510 A1 | 2/2010 | Tanigawa et al. | |
| 2010/0072316 A1* | 3/2010 | Hartzheim | 242/419.9 |

* cited by examiner

FILAMENT WINDING APPARATUS

CROSS REFERENCE TO RELATED APPLICATIONS

This application is a national stage of international application PCT/JP2011/071625, filed on Sep. 22, 2011, and claims the benefit of priority under 35 USC 119 of Japanese application 2010-256184, filed on Nov. 16, 2010, which are incorporated herein by reference.

TECHNICAL FIELD

The present invention relates to a filament winding apparatus.

BACKGROUND ART

A filament winding apparatus is known which has a hoop winding device and a helical winding device and performs hoop winding and helical winding on a liner repeatedly by turns so as to wind a fiber bundle around the liner, thereby forming a reinforcement layer (for example, the Patent Literature 1).

The hoop winding device has a wrapping table rotated around the axis of the liner. A bobbin is rotatably attached to the wrapping table. By fixing the end of the fiber bundle to the liner and rotating the wrapping table around the axis of the liner, the fiber bundle is wound onto the outer peripheral surface of the liner. The bobbin is rotated by pulling out the fiber bundle toward the liner.

PRIOR ART REFERENCE

Patent Literature

Patent Literature 1: the Japanese Patent Laid Open Gazette 2010-36461

DISCLOSURE OF INVENTION

Problems to Be Solved by the Invention

Now, the rotation speed of the wrapping table in the hoop winding is not fixed. Also, the speed of the fiber bundle pulled out from the bobbin toward the liner and wound onto the liner (winding speed) is not fixed. For example, when the winding direction of hoop winding is reversed at the end of the liner, the moving speed of the hoop winding device is reduced and the rotation speed of the wrapping table is reduced once near the end. After reversing the moving direction of the hoop winding device, the rotation speed of the wrapping table is increased to the original speed. In the hoop winding, the rotation speed of the wrapping table may be changed widely or suddenly even though the amount of change is small. Following it, the winding speed which is the speed of the fiber bundle pulled out from the bobbin may be changed widely or suddenly.

On the other hand, since the bobbin is rotated by pulling out the fiber bundle, the rotation speed of the bobbin is changed following the change of the winding speed. However, because of inertia applied on the bobbin, when the winding speed is changed widely or suddenly, the rotation speed of the bobbin may be not able to follow the change of the winding speed of the fiber bundle. When the winding speed of the fiber bundle is changed suddenly, the bobbin is rotated continuously by the inertia, whereby there is a problem in that the fiber bundle is pulled out excessively from the bobbin and slack is generated in the fiber bundle.

Namely, when the speed of the fiber bundle pulled out from the bobbin toward the liner and wound onto the liner (winding speed) is in agreement with the speed of the fiber bundle sent out from the bobbin by the rotation of the bobbin and unraveled (unraveling speed), any slack is not generated in the fiber bundle and the fiber bundle is wound onto the liner while a predetermined tension is applied on the fiber bundle. However, when the unraveling speed of the fiber bundle sent out from the bobbin is larger than the winding speed of the fiber bundle, slack is generated in the fiber bundle by the difference of speed. As a result, the tension of the fiber bundle wound onto the outer peripheral surface of the liner is reduced, whereby strength of the reinforcement layer is reduced.

For preventing excessive sending out of the fiber bundle, for example, a construction can be considered in which a servo motor controlling the rotation of the bobbin is provided in the wrapping table and the servo motor is controlled electrically from the outside so as to rotate the bobbin positively following the winding speed of the fiber bundle. However, the wrapping table to which the bobbin is attached is rotated itself. Providing many electrodes for transmitting a control signal from the outside of the wrapping table to the servo motor and supplying electric power for driving the motor are not easy because those complicate the construction.

The present invention is provided for solving the above problems. The first purpose of the present invention is to provide a filament winding apparatus in which excessive unraveling of a fiber bundle caused by change of winding speed of the fiber bundle is prevented, whereby reduction of tension of the fiber bundle wound onto an outer peripheral surface of a liner and reduction of strength of a reinforcement layer are prevented. The second purpose of the present invention is a filament winding apparatus in which providing many electrodes in a wrapping table or supplying large electric power is not necessary for controlling rotation of a bobbin.

Means for Solving the Problems

The above-mentioned problems are solved by the present invention with the following means.

The first invention is a filament winding apparatus winding a fiber bundle onto a surface of a liner with a hoop winding device. The hoop winding device includes a wrapping table, a bobbin support unit, a braking unit, a slack removal unit, a detector and a controller. The wrapping table is rotated around an axis of the liner. The bobbin support unit is provided in the wrapping table and supports a bobbin of the fiber bundle. The braking unit brakes rotation of the bobbin supported by the bobbin support unit. The slack removal unit absorbs slack caused by difference between winding speed of the fiber bundle purled out from the bobbin and wound onto the surface of the liner and unraveling speed of the fiber bundle unraveled from the bobbin by rotation of the bobbin. The detector detects that the slack absorbed by the slack removal unit is not less than a predetermined value and that the slack absorbed by the slack removal unit is less than the predetermined value. The controller increases braking power of the braking unit based on a detection signal from the detector detecting that the slack absorbed by the slack removal unit is not less than the predetermined value, and reduces braking power of the braking unit based on a detection signal from the detector detecting that the slack absorbed by the slack removal unit is less than the predetermined value.

The second invention is subject to the first invention, wherein when the detector detects excessive unraveling of the fiber bundle, the controller increases the braking power of the braking unit and the braking unit stops the rotation of the bobbin, and when the detector detects cancelation of the excessive unraveling of the fiber bundle, the controller reduces the braking power of the braking unit and the braking unit releases stop of the rotation of the bobbin.

The third invention is subject to the first or second invention, wherein the braking unit includes a hysteresis brake, and the controller controls excitation current supplied to the hysteresis brake so as to increase and reduce braking power of the hysteresis brake.

Effect of the Invention

The present invention constructed as the above brings the following effects.

According to the first invention, when it is detected that the slack absorbed by the slack removal unit is not less than the predetermined value, the braking power braking the rotation of the bobbin is increased. When it is detected that the slack absorbed by the slack removal unit is less than the predetermined value, the braking power braking the rotation of the bobbin is reduced. Accordingly, excessive unraveling of the fiber bundle caused by the change of the winding speed of the fiber bundle can be prevented, whereby the reduction of tension of the fiber bundle wound onto the outer peripheral surface of the liner and the reduction of strength of a reinforcement layer can be prevented.

According to the second invention, when the detector detects excessive unraveling of the fiber bundle, the controller increases braking power of the braking unit and the braking unit brakes the rotation of the bobbin. When the detector detects cancelation of the excessive unraveling of the fiber bundle, the controller reduces braking power of the braking unit and the braking unit releases the stop of the rotation of the bobbin. Accordingly, excessive unraveling of the fiber bundle caused by the change of the winding speed of the fiber bundle can be prevented certainly, whereby the reduction of tension of the fiber bundle wound onto the outer peripheral surface of the liner and the reduction of strength of a reinforcement layer can be prevented.

According to the third invention, the controller controls the excitation current supplied to the hysteresis brake so as to increase and reduce the braking power of the hysteresis brake. Since the rotation of the bobbin is controlled by the control of the excitation current, it is not necessary to provide many electrodes in the wrapping table or supply large electric power.

DETAILED DESCRIPTION OF THE INVENTION

Next, an explanation will be given on an embodiment of the present invention.

Embodiment 1

Firstly, an explanation will be given on entire construction of a filament winding apparatus 100 according to an embodiment 1 of the present invention. Hereinafter, the filament winding apparatus 100 is referred to as the FW apparatus 100.

Figure 1:
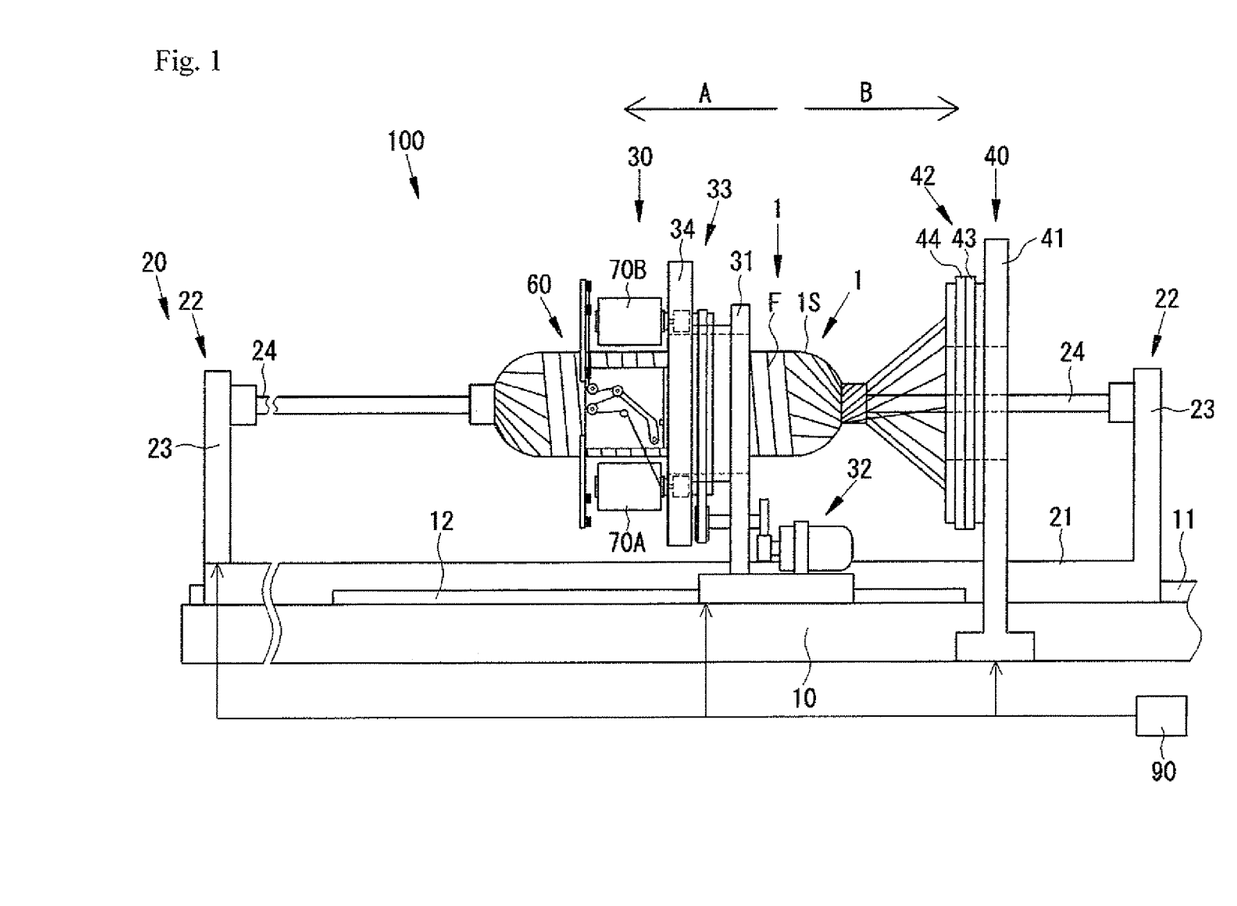
FIG. 1 is a side view of a FW apparatus 100 according to an embodiment 1.

FIG. 1 is a side view of the FW apparatus 100. FIG. 1 shows the state in which a hoop winding device 30 is at a winding position. The FW apparatus 100 performs hoop winding with the hoop winding device 30 and helical winding with a helical winding device 40 repeatedly by turns on a liner 1 so as to wind a fiber bundle F, into which resin was infiltrated, on the liner 1.

Arrows A and B in FIG. 1 indicate the longitudinal direction of the FW apparatus 100 and a transport direction of the liner 1 at the helical winding. In the helical winding, the liner 1 is reciprocated along the longitudinal direction of the FW apparatus 100, whereby the liner 1 is moved along the direction of the arrow A or B.

The liner 1 is a substantially cylindrical hollow vessel formed by high-intensity aluminum material, polyamide resin or the like for example. The pressure resistance of the liner 1 is improved by winding the fiber bundle F onto an outer peripheral surface 1S of the liner 1. Namely, the liner 1 is a base material constituting a pressure-resistant vessel. In below explanation, the term "the liner 1" means both the liner before the winding of the fiber bundle F and the liner after the winding of the fiber bundle F. For example, the outer peripheral surface 1S also means the surface of the wound fiber bundle F.

The FW apparatus 100 mainly includes a main pedestal 10, a liner transport device 20, the hoop winding device 30, the helical winding device 40 and a controller 90. The main pedestal 10 constitutes the basis of the FW apparatus 100. In the upper portion of the main pedestal 10, a rail 11 for the liner transport device is provided. The liner transport device 20 is mounted on the rail 11. In the upper portion of the main pedestal 10, a rail 12 for the hoop winding device is provided in parallel to the rail 11. The hoop winding device 30 is mounted on the rail 12. According to the construction, the liner transport device 20 and the hoop winding device 30 can be moved concerning the main pedestal 10. The helical winding device 40 is fixed to the main pedestal 10.

The liner transport device 20 rotates the liner 1 about the longitudinal direction of the FW apparatus 100 as a rotation axis and transports the liner 1 along the longitudinal direction of the FW apparatus 100. The liner transport device 20 mainly includes a pedestal 21 and liner support parts 22. The drive of the liner transport device 20 is controlled by the controller 90.

The pedestal 21 has the pair of the liner support parts 22. Each of the liner support parts 22 includes a liner support frame 23 and a rotational shaft 24. The liner support frame 23 is extended upward from the pedestal 21. The rotational shaft 24 is extended from the liner support frame 23 along the longitudinal direction of the FW apparatus 100. The rotational shaft 24 is rotated along one direction around the axis by a power mechanism (not shown). The rotational shaft 24 supports both ends of the liner 1 and rotates the liner 1. According to the construction, the liner transport device 20 rotates the liner 1 about the longitudinal direction of the FW apparatus 100 as a rotation axis and transports the liner 1 along the longitudinal direction of the FW apparatus 100.

The hoop winding device 30 winds the fiber bundle F onto the outer peripheral surface 1S of the liner 1. In the hoop winding, the fiber bundle F is wound onto the outer peripheral surface 1S of the liner 1 so as to make the winding angle of the fiber bundle F concerning the axis of the liner 1 substantially 90°. The hoop winding device 30 mainly includes a pedestal 31, a power mechanism 32 and a hoop mounting device 33. The drive of the hoop winding device 30 is controlled by the controller 90.

In the pedestal 31, the power mechanism 32 and the hoop mounting device 33 are provided. The hoop mounting device 33 includes a wrapping table 34. A space into which the liner 1 is inserted is provided at the center of the wrapping table 34, and bobbins 70A, 70B, 70C and 70D are arranged around the space (see FIG. 3). The fiber bundle F is supplied from the bobbins 70A, 70B, 70C and 70D to the outer peripheral surface 1S of the liner 1. The hoop mounting device 33 is rotated by the power mechanism 32 around the axis of the liner 1. As each of the bobbins 70A, 70B, 70C and 70D, a paper cylinder onto which the fiber bundle F is wound is used.

In the hoop winding, the position of the liner 1 is fixed, and the hoop mounting device 33 is rotated around the axis of the liner 1 while reciprocating the hoop winding device 30 along the axis of the liner 1. Accordingly, the hoop winding is performed. By controlling moving speed of the hoop mounting device 33 and rotating speed of the wrapping table 34, the winding mode of the fiber bundle F can be changed. The hoop winding device 30 will be described in detail later.

The helical winding device 40 helical-winds the fiber bundle F onto the outer peripheral surface 1S of the liner 1. The helical winding device 40 winds the fiber bundle F onto the outer peripheral surface 1S of the liner 1 so as to make the winding angle of the fiber bundle F be a predetermined value (for example, 0 to 60°). The helical winding device 40 mainly includes a pedestal 41 and a helical mounting device 42. The drive of the helical winding device 40 is controlled by the controller 90.

In the pedestal 41, the helical mounting device 42 is provided. The helical mounting device 42 includes a first helical head 43 and a second helical head 44. The fiber bundle F is supplied from a plurality of bobbins (not shown) to the first helical head 43 and the second helical head 44, and the fiber bundle F is guided to the outer peripheral surface 1S of the liner 1.

In the helical winding, the helical winding device 40 is fixed, and the liner transport device 20 transports the liner 1 along the rotation axis while rotating the liner 1. Accordingly, the helical winding is performed. By controlling transfer speed and rotating speed of the liner 1, the winding mode of the fiber bundle F can be changed.

Figure 2:
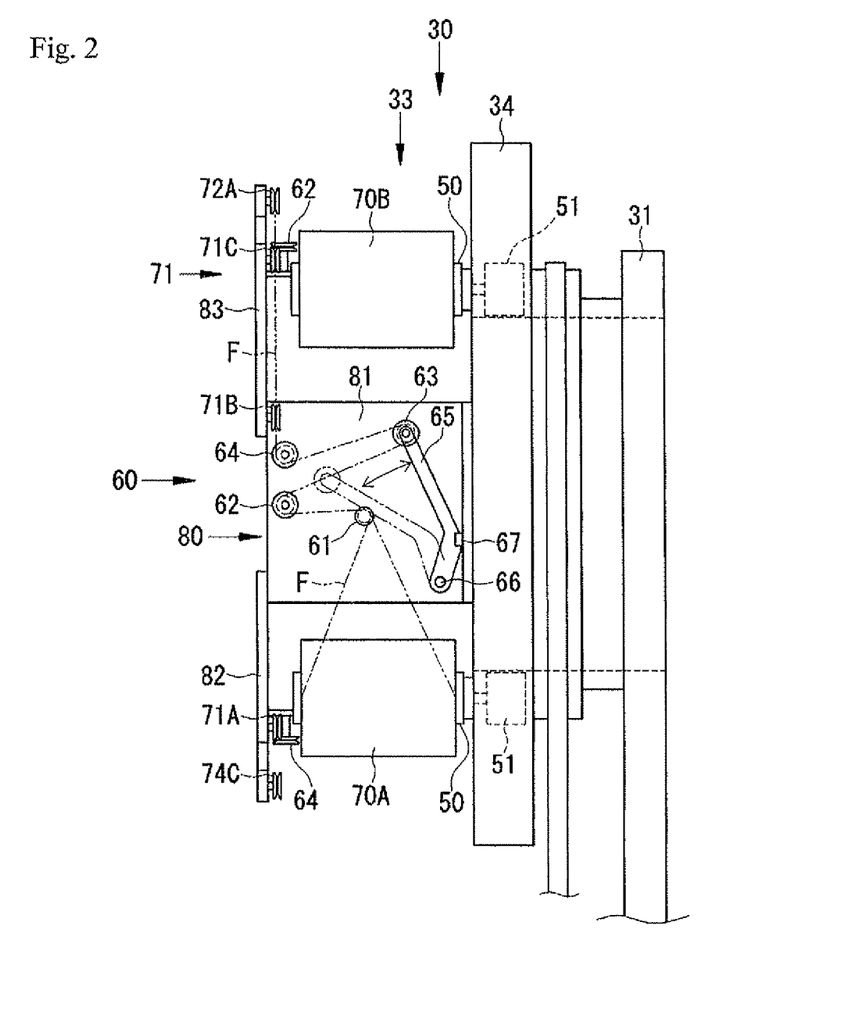
FIG. 2 is a side view of a hoop winding device 30.

Next, an explanation will be given on the hoop winding device 30, which is a characteristic part of the present invention, in detail. FIG. 2 is a side view of the hoop winding device 30, and FIG. 3 is a front view of the hoop winding device 30.

Figure 3:
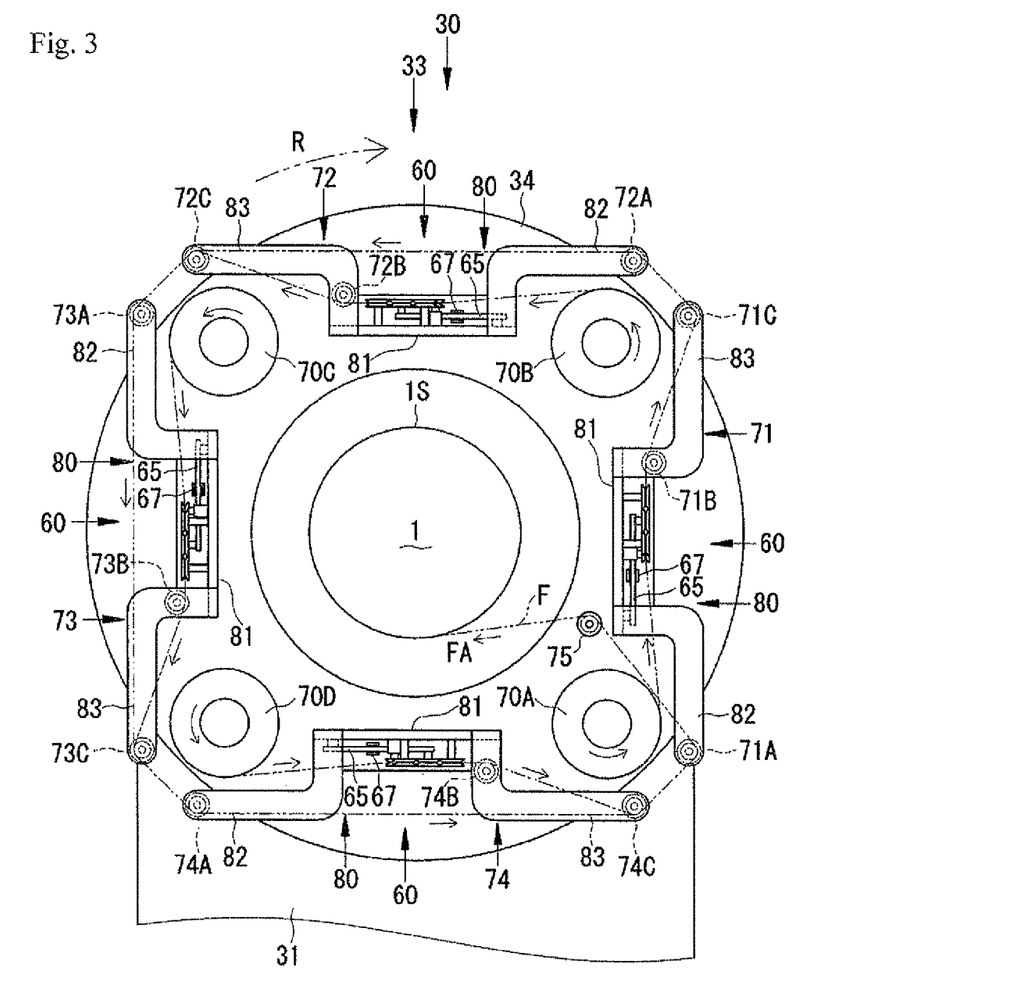
FIG. 3 is a front view of the hoop winding device 30.

As shown in FIGS. 2 and 3, four pairs of bobbin support units 50, the bobbins 70A, 70B, 70C and 70D, frames 80, guide rollers 71, 72, 73 and 74, slack removal units 60, and detectors 67 are arranged in the wrapping table 34 of the hoop winding device 30. The bobbin support unit 50, the frame 80 and the guide rollers 71, 72, 73 and 74 provided concerning each of the bobbins 70A, 70B, 70C and 70D have substantially the same construction. Therefore, the construction common to each of the pairs is explained mainly about the bobbin support unit 50, the frame 80 and the guide rollers 71, 72, 73 and 74 provided concerning the bobbin 70A, and the explanation about the bobbin support unit 50, the frame 80 and the guide rollers 71, 72, 73 and 74 provided concerning each of the bobbins 70B, 70C and 70D is omitted.

The wrapping table 34 is rotated along an arrow R in FIG. 3 by the power mechanism 32. The power mechanism 32 is connected to the controller 90, and rotation and stop is controlled based on a signal from the controller 90. The fiber bundle F guided from a fiber supply guide 75 to the liner 1 is wound on the outer peripheral surface 1S of the liner 1 while being rotated along the arrow R. The fiber bundle F is supplied along an arrow FA, that is, toward the downstream side in the rotation direction of the wrapping table 34.

The bobbin support unit 50 supporting the bobbin 70A is supported so as to be rotatable concerning the wrapping table 34, and is connected to a hysteresis brake 51 as a braking unit. By pulling the fiber bundle F while the bobbin 70A is supported by the bobbin support unit 50, the bobbin 70A is rotated and the fiber bundle F is drawn out.

The hysteresis brake 51 brakes the rotation of the bobbin 70A supported by the bobbin support unit 50. The hysteresis brake 51 is connected to the bobbin support unit 50, and brakes the rotation of the bobbin 70A by braking the rotation of the bobbin support unit 50. The hysteresis brake 51 is a kind of an electric brake and braking power thereof is increased by the control increasing excitation current supplied to a coil. The controller 90 is connected to each of the hysteresis brakes 51. The controller 90 controls independently the excitation current supplied to each of the hysteresis brakes 51 so as to increase and reduce the braking power of the hysteresis brake 51. Electric power required for the hysteresis brake 51 may be supplied from the outside of the wrapping table 34 or a battery mounted on the wrapping table 34.

The four fiber bundles F from the bobbins 70A, 70B, 70C and 70D supported by the bobbin support units 50 are collected at the guide rollers 71, 72, 73 and 74 and guided to the fiber supply guide 75. Each of the guide rollers 71, 72, 73 and 74 is supported by the frame 80. The frame 80 includes a first frame 81 standingly provided concerning the wrapping table 34 and a second frame 82 and a third frame 83 provided in the first frame 81.

A route through which the fiber bundle F is guided is described concretely. As shown in FIG. 2, the fiber bundle F from the bobbin 70A is guided through guide rollers 71B, 71C, guide rollers 72A, 72C, guide rollers 73A, 73C, guide rollers 74A, 74C, and a guide roller 71A to the fiber supply guide 75. The fiber bundle F from the bobbin 70B is guided through guide rollers 72B and 72C and joins the fiber bundle F from the bobbin 70A of the upstream side in the guide roller 72C, and then guided to the fiber supply guide 75 together with the fiber bundle F from the bobbin 70A. The fiber bundle F from the bobbin 70C is guided through guide rollers 73B and 73C and joins the fiber bundles F from the bobbins 70A and 70B of the upstream side in the guide roller 73C, and then guided to the fiber supply guide 75 together with the fiber bundles F from the bobbin 70A and 70B. The fiber bundle F from the bobbin 70D is guided through guide rollers 74B and 74C and joins the fiber bundles F from the bobbins 70A, 70B and 70C of the upstream side in the guide roller 74C, and then guided to the fiber supply guide 75 together with the fiber bundles F from the bobbin 70A, 70B and 70C. The fiber supply guide 75 supplies the joining four fiber bundles F to the outer peripheral surface 1S of the liner 1.

At the middle of the route of the fiber bundle F from the bobbin 70A to the guide roller 71B, the slack removal unit 60 is provided. The slack removal unit 60 absorbs the slack of the fiber bundle F drawn out from the bobbin 70A. The slack removal unit 60 is provided in the frame 80.

In the case in which a winding speed V1 of the fiber bundle F drawn out from the bobbin 70A and wound onto the outer peripheral surface 1S of the liner 1 is changed widely or suddenly, when the rotation speed of the bobbin 70A cannot follow the change of the winding speed V1 of the fiber bundle F, the slack of the fiber bundle F is generated. For example, when the winding speed V1 of the fiber bundle F is changed suddenly, the bobbin 70A continues rotating by inertia and the fiber bundle F is sent out from the bobbin 70A excessively so that an unraveling speed V2 of the unraveled fiber bundle F becomes larger than the winding speed V1 of the fiber bundle F, whereby the slack of the fiber bundle F is generated. Accordingly, the slack of the fiber bundle F is generated by the difference between the winding speed V1 of the fiber bundle F drawn out from the bobbin 70A and wound onto the outer peripheral surface 1S of the liner 1 and the unraveling speed V2 of the fiber bundle F unraveled from the bobbin 70A by the rotation of the bobbin 70A.

Figure 4:
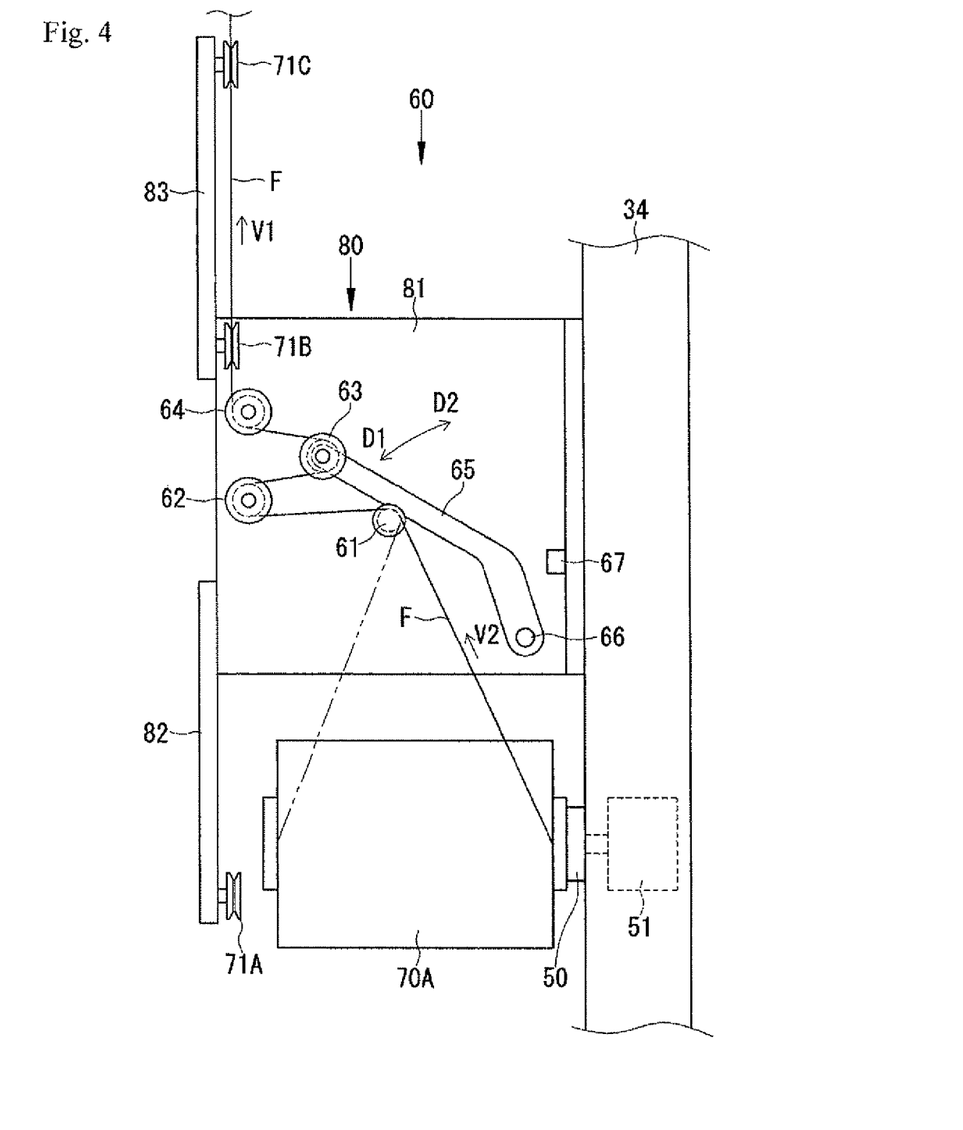
FIG. 4 is a side view of a slack removal unit 60.

The slack removal unit 60 is described in detail. FIG. 4 is a side view of the slack removal unit 60. As shown in FIG. 4, the slack removal unit 60 has a first roller 61, a second roller 62, a third roller 63, a fourth roller 64 and an arm 65. The fiber bundle F is wound on the first roller 61, the second roller 62, the third roller 63 and the fourth roller 64 in this order. The first roller 61 is a fulcrum of the fiber bundle F unraveled from the bobbin 70A and is provided so as to be rotatable concerning the first frame 81. The fourth roller 64 guides the fiber bundle F to the guide roller 71B and is provided so as to be rotatable concerning the first frame 81. The second roller 62 guides the fiber bundle F between the first roller 61 and the fourth roller 64 and is provided so as to be rotatable concerning the first frame 81.

The third roller 63 increases and reduces the length of the route of the fiber bundle F between the second roller 62 and the fourth roller 64, and is provided so as to be rotatable concerning the arm 65. The arm 65 is provided in the first frame 81 so as to be swingable centering on a pivot 66 along directions D1 and D2. A torsion spring (not shown) is provided in the pivot 66 and the third roller 63 provided in the arm 65 is biased so as to be separated from the second roller 62 and the fourth roller 64. A virtual plane in which the arm 65 is rocked is in parallel to the rotation axis of the wrapping table 34. Accordingly, influence of centrifugal force by the rotation of the wrapping table 34 on the arm 65 is reduced.

When a predetermined tension is applied on the fiber bundle F, that is, when the winding speed V1 of the fiber bundle F is equal to or larger than the unraveling speed V2 of the unraveled fiber bundle F, the third roller 63 is pulled so as to be made be close to the second roller 62 and the fourth roller 64. Accordingly, the arm 65 is rotated along the direction D1 oppositely to the biasing power of the torsion spring, and the third roller 63 becomes close to the second roller 62 and the fourth roller 64. When the third roller 63 is at a position of a predetermined distance for the second roller 62 and the fourth roller 64, the arm 65 contacts the member supporting the first roller 61 and further approach is prevented.

On the other hand, when the tension of the fiber bundle F is reduced, that is, when the winding speed V1 of the fiber bundle F is smaller than the unraveling speed V2 of the unraveled fiber bundle F, the arm 65 is rotated along the direction D2 by the biasing power of the torsion spring provided in the pivot 66 of the arm 65, whereby the third roller 63 is separated from the second roller 62 and the fourth roller 64.

Accordingly, when the winding speed V1 of the fiber bundle F becomes smaller than the unraveling speed V2 of the unraveled fiber bundle F and the tension of the fiber bundle F is reduced, the arm 65 is rotated along the direction D2 and the slack is absorbed before the generation of slack, whereby the reduction of the tension is prevented. When the winding speed V1 of the fiber bundle F becomes larger than the unraveling speed V2 of the unraveled fiber bundle F and the tension of the fiber bundle F is increased, the arm 65 is rotated along the direction D1, whereby the increase of the tension is prevented. Therefore, the slack removal unit 60 can absorb the slack generated in the fiber bundle F within the range of rocking of the arm 65.

The detector 67 detects whether the arm 65 is rotated to a predetermined position or not. Namely, the detector 67 detects whether the slack absorbed by the slack removal unit 60 is less than a predetermined value or not.

When the detector 67 detects that the slack absorbed by the slack removal unit 60 is not less than the predetermined value by detecting the arm 65, a detection signal to that effect is transmitted to the controller 90. When the detector 67 detects that the slack absorbed by the slack removal unit 60 is net less than the predetermined value by not detecting the arm 65, a detection signal to that effect is transmitted to the controller 90. As the detector 67, a known sensor such as a photoelectric sensor can be used. Electric power required for the detector 67 may be supplied from the outside of the wrapping table 34 or a battery mounted on the wrapping table 34.

When the detector 67 detects that the slack absorbed by the slack removal unit 60 is not less than the predetermined value, the controller 90 increases the braking power of the hysteresis brake 51 based on the detection signal from the detector 67.

Concretely, when the tension of the fiber bundle F is reduced and the arm 65 is rotated to the position which can be detected by the detector 67, the detector 67 detects the state and transmits a detection signal to that effect to the controller 90. When the controller 90 receives the detection signal, the controller 90 performs the control to increase the braking power of the hysteresis brake 51. The braking power is enough to stop the rotation of the bobbin 70A. The braking power may alternatively be enough to reduce the rotation speed of the bobbin 70A and not to stop the rotation of the bobbin 70A.

On the other hand, when the detector 67 detects that the slack absorbed by the slack removal unit 60 is less than the predetermined value, the controller 90 reduces the braking power of the hysteresis brake 51 based on the detection signal from the detector 67.

Concretely, when the tension of the fiber bundle F is increased and the arm 65 is rotated to the position which cannot be detected by the detector 67, the detector 67 detects the state and transmits a detection signal to that effect to the controller 90. When the controller 90 receives the detection signal, the controller 90 performs the control to reduce the braking power of the hysteresis brake 51. The braking power at this state is zero. The braking power may alternatively be not zero but a certain value.

Next, an explanation will be given on a flow of operation of the hoop winding device 30 at the hoop winding of the FW apparatus 100 referring to FIGS. 4 to 7. The liner 1 in this embodiment has a cylindrical part having a fixed radius and dome parts provided at both ends of the cylindrical part (see FIG. 1). The liner transport device 20 is equipped with the liner 1 and then the hoop winding is performed. An operator inputs beforehand conditions of the hoop winding, that is, moving speed of the hoop winding device 30 at each parts of the liner 1, rotation speed of the wrapping table 34 at each parts of the liner 1, number of reciprocation of the hoop winding device 30, moving distance of the hoop winding device 30, and the like into the controller 90. Based on the inputted conditions of the hoop winding, the controller 90 controls the hoop winding device 30 as mentioned below. Each of the slack removal units 60 is operated independently, but the contents of the operation are common. Therefore, operation of the slack removal unit 60 provided concerning the bobbin 70A is described below.

Firstly, an explanation will be given on the state just before starting winding of the fiber bundle F with the hoop winding device 30. In this state, tension is not applied on the fiber bundle F. The arm 65 is rotated toward the direction D2 by the biasing power of the torsion spring provided in the pivot 66 (see FIG. 6).

Figure 7:
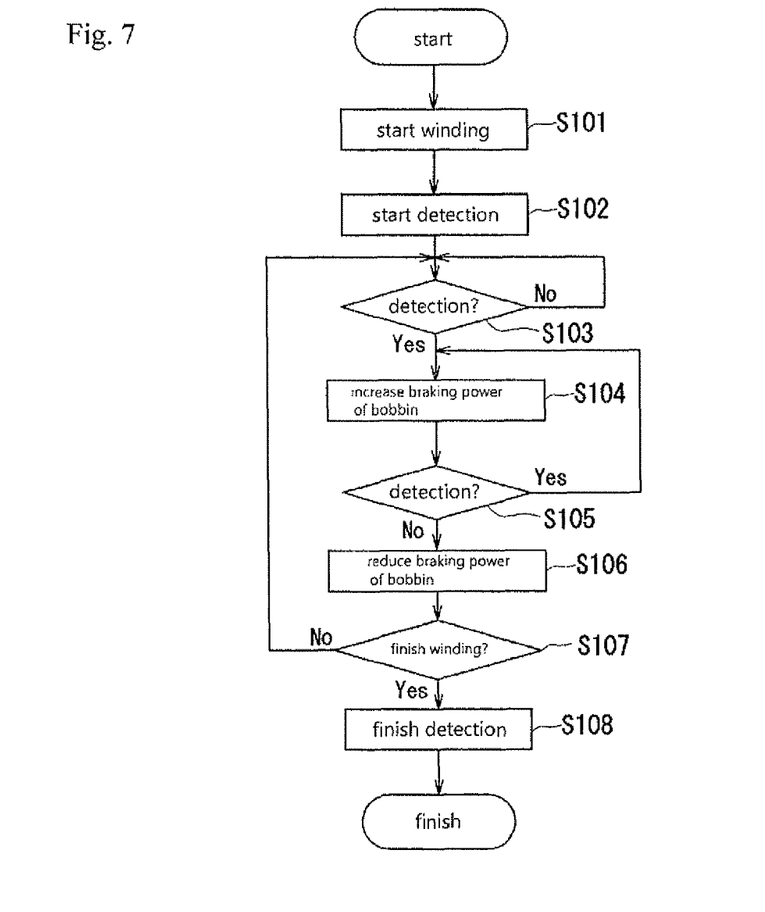
FIG. 7 is a flow chart of operation of the hoop winding device 30 in hoop winding.

When the winding of the fiber bundle F with the hoop winding device 30 is started (step S101), the detector 67 starts detection (step S102). In the winding of the fiber bundle F with the hoop winding device 30, the wrapping table 34 is moved along the lateral direction in the drawing while being rotated so as to hoop-wind the fiber bundle F onto the outer peripheral surface 1S of the liner 1.

In the state just after starting the winding of the fiber bundle F with the hoop winding device 30, tension is not applied on the fiber bundle F. The arm 65 is rotated toward the direction D2 by the biasing power of the torsion spring provided in the pivot 66 (see FIG. 6). Therefore, the detector 67 detects the arm 65 (Yes at step S103).

When the detector 67 detects the arm 65 (Yes at step S103), the tension of the fiber bundle F is reduced, and the arm 65 is rotated to a position which can be detected by the detector 67. In this case, the detector 67 detects that the slack absorbed by the slack removal units 60 is not less than the predetermined value, and transmits a detection signal to that effect to the controller 90. Based on the detection signal from the detector 67, the controller 90 increases maximally the braking power of the hysteresis brake 51 (step S104).

When the braking power of the hysteresis brake 51 is increased maximally, the rotation of the bobbin 70A is stopped. In this state, the winding speed V1 of the fiber bundle F is larger than the unraveling speed V2 (=0) of the unraveled fiber bundle F, whereby the third roller 63 is pulled so as to be close to the second roller 62 and the fourth roller 64. Accordingly, the arm 65 is rotated toward the direction D1 oppositely to the biasing power of the torsion spring, and the third roller 63 becomes close to the second roller 62 and the fourth roller 64. Even when the rotation of the bobbin 70A is stopped, the fiber bundle F is supplied to the liner 1 by the rotation of the arm 65, whereby the hoop winding of the fiber bundle F can be performed.

Figure 6:
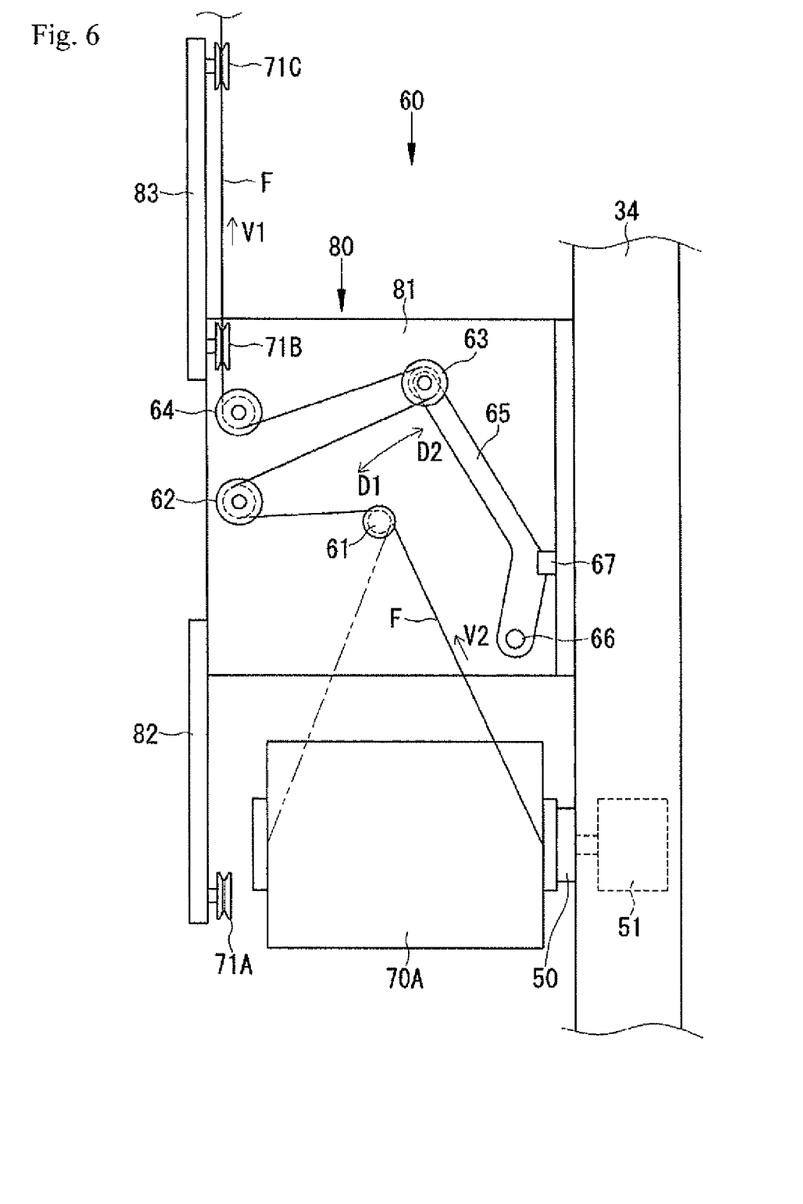
FIG. 6 is a side view of the slack removal unit 60.

When the detector 67 continues detection of the arm 65 and the detector 67 detects the arm 65 (Yes at step S105), the tension of the fiber bundle F is still low and the arm 65 is at the position which can be detected by the detector 67 (see FIG. 6). In this case, the detector 67 detects that the slack absorbed by the slack removal units 60 is not less than the predetermined value, and transmits a detection signal to that effect to the controller 90. Based on the detection signal from the detector 67, the controller 90 maintains the braking power of the hysteresis brake 51 increased maximally (step S104).

Figure 5:
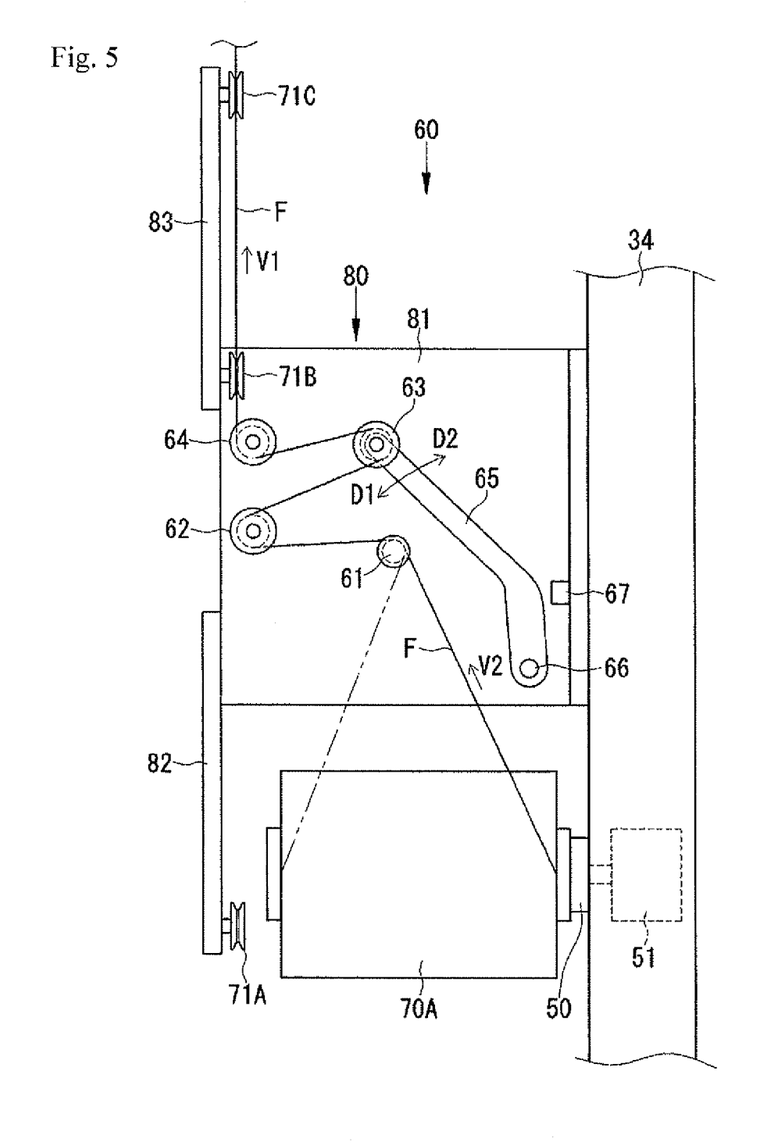
FIG. 5 is a side view of the slack removal unit 60.

When the detector 67 continues detection of the arm 65 and the detector 67 does not detect the arm 65 (No at step S105), the predetermined tension is applied on the fiber bundle F and the arm 65 is at the position which cannot be detected by the detector 67 (see FIG. 5). In this case, the detector 67 detects that the slack absorbed by the slack removal units 60 is less than the predetermined value, and transmits a detection signal to that effect to the controller 90. Based on the detection signal from the detector 67, the controller 90 reduces the braking power of the hysteresis brake 51 (step S106). The rotation of the bobbin 70A is started, and the fiber bundle F is supplied to the liner 1.

At a step S107, whether the winding of the fiber bundle F with the hoop winding device 30 is finished or not is judged. When the winding of the fiber bundle F with the hoop winding device 30 is judged not finished (No at step S107), the step S103 is repeated.

At the step S103, when the detector 67 continues detection of the arm 65 and the detector 67 does not detect the arm 65 (No at step S103), the predetermined tension is applied on the fiber bundle F and the arm 65 is at the position which cannot be detected by the detector 67 (see FIG. 5). In this case, the detector 67 detects that the slack absorbed by the slack removal units 60 is less than the predetermined value, and transmits a detection signal to that effect to the controller 90. Based on the detection signal from the detector 67, the controller 90 reduces the braking power of the hysteresis brake 51. Hereinafter, until the winding of the fiber bundle F with the hoop winding device 30 is judged not to be finished at the step S107 (No at step S107), the steps S103 to S107 are repeated.

Accordingly, the arm 65 of the slack removal units 60 repeats the states of FIGS. 4, 5 and 6. When the winding speed V1 of the fiber bundle F becomes smaller than the unraveling speed V2 of the unraveled fiber bundle F and the tension of the fiber bundle F is reduced, the arm 65 is rotated toward the direction D2 before the slack is generated so that the slack is absorbed, whereby the tension is prevented from being reduced. When the arm 65 is rotated to the position which can be detected by the detector 67, the braking power of the hysteresis brake 51 is increased maximally so as to stop the rotation of the bobbin 70A. In the state in which the rotation of the bobbin 70A is stopped, the fiber bundle F is supplied to the liner 1 by the rotation of the arm 65 toward the direction D1, whereby the hoop winding of the fiber bundle F is continued. When the winding speed V1 of the fiber bundle F becomes larger than the unraveling speed V2 of the unraveled fiber bundle F and the tension of the fiber bundle F is increased, the arm 65 is rotated toward the direction D1. When the arm 65 is rotated to the position which cannot be detected by the detector 67, the braking power of the hysteresis brake 51 is reduced and the rotation of the bobbin 70A is started, whereby the fiber bundle F is supplied to the liner 1.

At the step S107, when the hoop winding of the fiber bundle F is judged to be finished (Yes at step S107), the detector 67 finishes the detection (step S108).

The FW apparatus 100 according to the present invention constructed as the above brings the following effects.

When the detector 67 detects that the slack absorbed by the slack removal units 60 is not less than the predetermined value, the hysteresis brake 51 increases the braking power braking the rotation of the bobbin 70A so as to stop the rotation of the bobbin 70A. When the detector 67 detects that the slack absorbed by the slack removal units 60 is less than the predetermined value, the hysteresis brake 51 decreases the braking power braking the rotation of the bobbin 70A so as to release the stop of rotation of the bobbin 70A. Accordingly, excessive unraveling of the fiber bundle F from the bobbin 70A caused by the change of the winding speed V1 of the fiber bundle F can be prevented, whereby the reduction of tension of the fiber bundle F wound onto the outer peripheral surface 1S of the liner 1 and the reduction of strength of a reinforcement layer can be prevented certainly.

The controller 90 controls the excitation current supplied to the hysteresis brake 51 so as to increase and reduce the braking power of the hysteresis brake 51. Since the rotation of the bobbin 70A is controlled by the control of the excitation current, it is not necessary to provide many electrodes in the wrapping table 34 or supply large electric power.

The embodiment of the present invention has been described above. However, the present invention is not limited to the embodiment and various alternations can be performed. In the embodiment, though the hysteresis brake 51 is used as a braking part, the braking part is not limited thereto. Any brake which can increase and reduce the braking power following the control from the controller 90 can be used. For example, a known non-contacting brake such as an electromagnetic brake or a known contacting brake such as a disc brake can be used.

Though the slack removal units 60 are constructed so that the third roller 63 is moved concerning the second roller 62 and the fourth roller 64 by the rocking of the arm 65 so as to absorb the slack of the fiber bundle F, the construction of the slack removal units 60 is not limited thereto. For example, the third roller 63 may be moved linearly.

In the embodiment, the FW apparatus 100 having the hoop winding device 30 and the helical winding device 40 is explained. However, the present invention may be used for a FW apparatus only for hoop winding.

INDUSTRIAL APPLICABILITY

A filament winding apparatus according to the present invention can prevent excessive unraveling of a fiber bundle caused by change of winding speed of the fiber bundle so that reduction of tension of the fiber bundle wound onto an outer peripheral surface of a liner and reduction of strength of a reinforcement layer can be prevented, whereby the filament winding apparatus is useful industrially.

DESCRIPTION OF NOTATIONS 1 liner
1S outer peripheral surface
10 main pedestal
11 rail for liner transfer device
12 rail for hoop winding device
20 liner transfer device
21 pedestal
22 liner support part
23 liner support frame
24 rotational shaft
30 hoop winding device
31 pedestal
32 power mechanism
33 hoop mounting device
34 wrapping table
40 helical winding device
41 pedestal
42 helical mounting device
43 first helical head
44 second helical head
50 bobbin support unit
51 hysteresis brake
60 slack removal unit
61 first roller
62 second roller
63 third roller
64 fourth roller
65 arm
66 pivot
67 detector
70A bobbin
71 guide roller
75 fiber supply guide
80 frame
81 first frame
82 second frame
83 third frame
90 controller
100 FW apparatus

The invention claimed is:

1. A filament winding apparatus winding a fiber bundle onto a surface of a liner with a hoop winding device, wherein the hoop winding device comprising:
a wrapping table rotated around an axis of the liner;
a bobbin support unit provided in the wrapping table and supporting a bobbin of the fiber bundle;
a braking unit braking rotation of the bobbin supported by the bobbin support unit;
a slack removal unit absorbing slack caused by difference between winding speed of the fiber bundle pulled out from the bobbin and wound onto the surface of the liner and unraveling speed of the fiber bundle unraveled from the bobbin by rotation of the bobbin;
a detector detecting that the slack absorbed by the slack removal unit is not less than a predetermined value and that the slack absorbed by the slack removal unit is less than the predetermined value; and
a controller increasing braking power of the braking unit based on a detection signal from the detector detecting that the slack absorbed by the slack removal unit is not less than the predetermined value and reducing braking power of the braking unit based on a detection signal from the detector detecting that the slack absorbed by the slack removal unit is less than the predetermined value.

2. The filament winding apparatus according to claim 1, wherein when the detector detects excessive unraveling of the fiber bundle, the controller increases the braking power of the braking unit and the braking unit stops the rotation of the bobbin, and
wherein when the detector detects cancelation of the excessive unraveling of the fiber bundle, the controller reduces the braking power of the braking unit and the braking unit releases stop of the rotation of the bobbin.

3. The filament winding apparatus according to claim 1 or 2,
wherein the braking unit includes a hysteresis brake, and
wherein the controller controls excitation current supplied to the hysteresis brake so as to increase and reduce braking power of the hysteresis brake.

\* \* \* \* \*